United States Patent
Heo et al.

(10) Patent No.: US 10,870,941 B2
(45) Date of Patent: Dec. 22, 2020

(54) CONTROL METHOD OF LAUNDRY TREATMENT APPARATUS

(71) Applicant: LG Electronics Inc., Seoul (KR)

(72) Inventors: Kwangchul Heo, Seoul (KR); Kijung Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 15/548,336

(22) PCT Filed: Feb. 22, 2016

(86) PCT No.: PCT/KR2016/001709
§ 371 (c)(1),
(2) Date: Aug. 2, 2017

(87) PCT Pub. No.: WO2016/137178
PCT Pub. Date: Sep. 1, 2016

(65) Prior Publication Data
US 2018/0016727 A1 Jan. 18, 2018

(30) Foreign Application Priority Data
Feb. 23, 2015 (KR) .......................... 10-2015-0025106

(51) Int. Cl.
*D06F 33/00* (2020.01)
*D06F 34/18* (2020.01)
(Continued)

(52) U.S. Cl.
CPC ............ *D06F 33/00* (2013.01); *D06F 29/005* (2013.01); *D06F 34/18* (2020.02); *D06F 37/04* (2013.01);
(Continued)

(58) Field of Classification Search
CPC ...................................................... D06F 33/02
See application file for complete search history.

(56) References Cited

U.S. PATENT DOCUMENTS 3,824,813 A     7/1974   Davis
5,444,996 A *   8/1995   Joslin ...................... D06F 33/02
                                                                 68/12.04

(Continued)

FOREIGN PATENT DOCUMENTS

KR    10-1991-0006790 B1    9/1991
KR    10-2001-0065084 A     7/2001
(Continued)

*Primary Examiner* — Jason Y Ko
(74) *Attorney, Agent, or Firm* — Dentons US LLP

(57) ABSTRACT

A control method of a laundry treatment apparatus is disclosed. The control method includes supplying electric power to a first load unit to execute a first cycle set in a first treatment device (a first step), supplying electric power to a second load unit to execute a second cycle set in a second treatment device (a second step), when an amount of current per unit time that is supplied to the laundry treatment apparatus is equal to or greater than a predetermined reference current amount, terminating the second step and executing a third cycle set in the second treatment device so as to consume a lower amount of current than an amount of current per unit time necessary to execute the second cycle (a third step), terminating the first cycle of the first treatment device (a fourth step), and executing the second cycle of the second treatment device after completing the fourth step (a fifth step).

21 Claims, 6 Drawing Sheets

(51) Int. Cl.
| | | |
|---|---|---|
| *D06F 58/30* | (2020.01) | |
| *D06F 29/00* | (2006.01) | |
| *D06F 37/04* | (2006.01) | |
| *D06F 37/12* | (2006.01) | |
| *D06F 37/30* | (2020.01) | |
| *D06F 37/42* | (2006.01) | |
| *D06F 39/04* | (2006.01) | |
| *G05B 15/02* | (2006.01) | |
| *D06F 34/28* | (2020.01) | |
| *D06F 103/38* | (2020.01) | |

(52) U.S. Cl.
CPC ............ *D06F 37/12* (2013.01); *D06F 37/304* (2013.01); *D06F 37/42* (2013.01); *D06F 39/04* (2013.01); *D06F 58/30* (2020.02); *G05B 15/02* (2013.01); *D06F 34/28* (2020.02); *D06F 2103/38* (2020.02); *D06F 2202/08* (2013.01); *D06F 2202/12* (2013.01); *D06F 2204/10* (2013.01); *D06F 2212/02* (2013.01); *D06F 2220/00* (2013.01)

(56) References Cited

U.S. PATENT DOCUMENTS

2006/0117491 A1 6/2006 Kim
2011/0041258 A1 2/2011 Ko et al.

FOREIGN PATENT DOCUMENTS

| KR | 10-2008-0010047 A | 1/2008 |
|---|---|---|
| KR | 10-2010-0099977 A | 9/2010 |
| WO | 2008/148400 A1 | 12/2008 |
| WO | 2011057955 A1 | 5/2011 |

* cited by examiner

[Fig. 1]
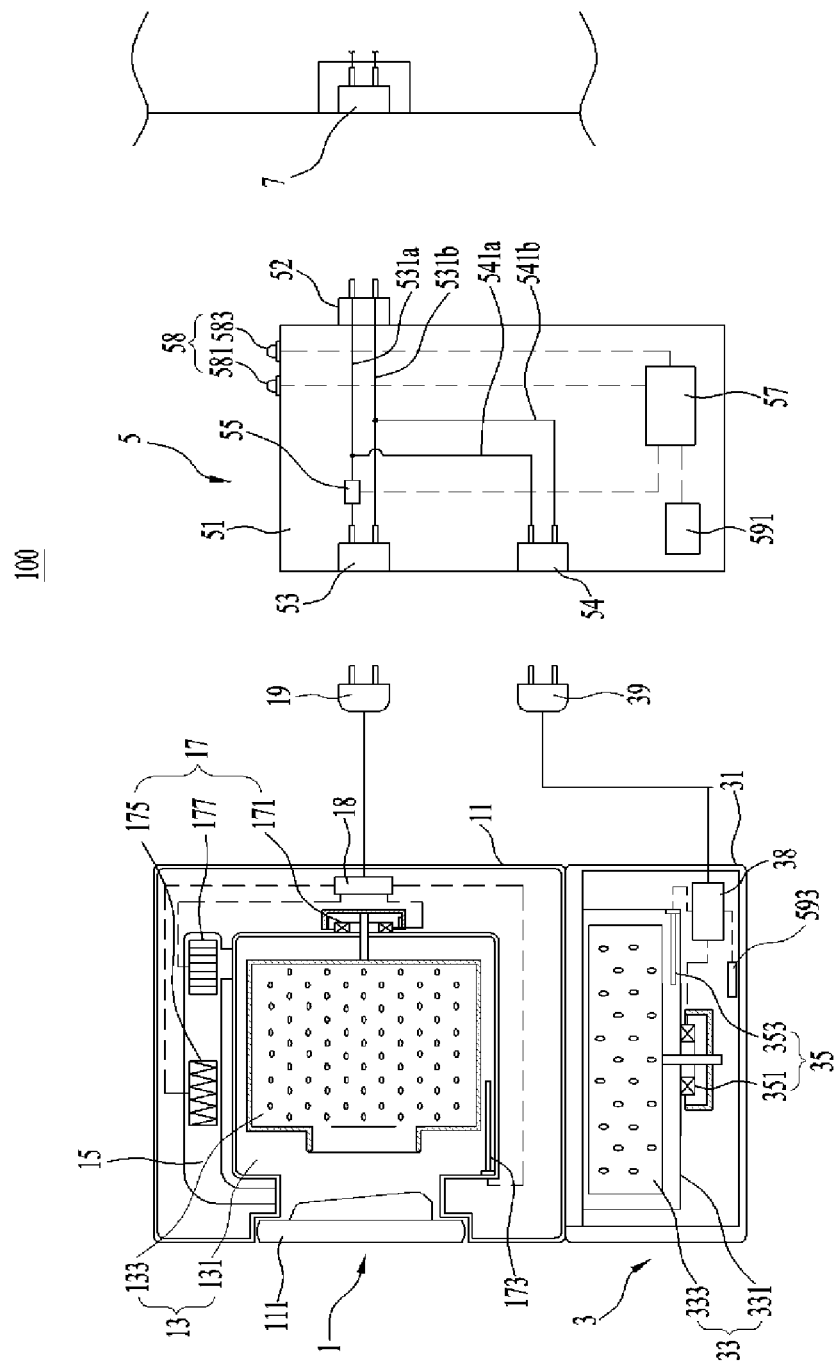

[Fig. 2]
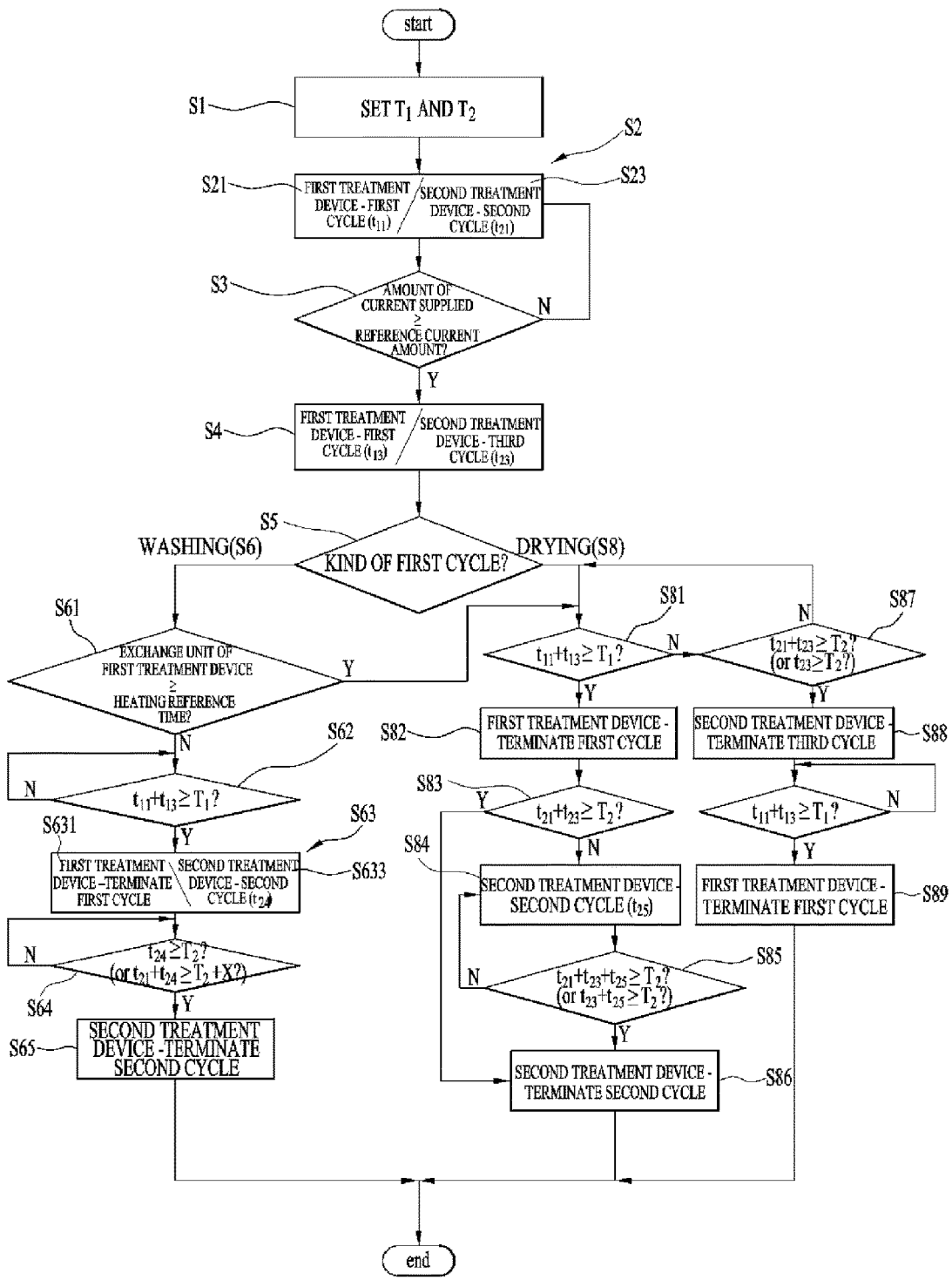

[Fig. 3]
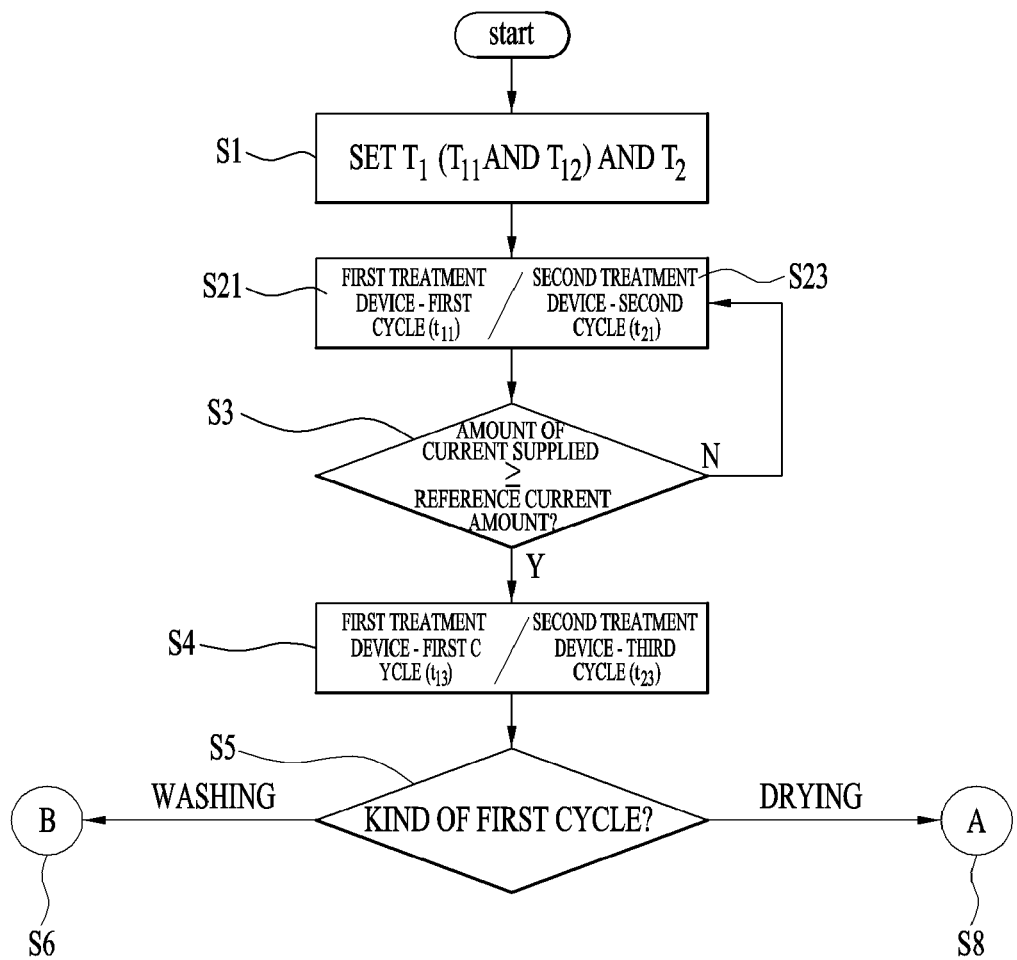

[Fig. 4]
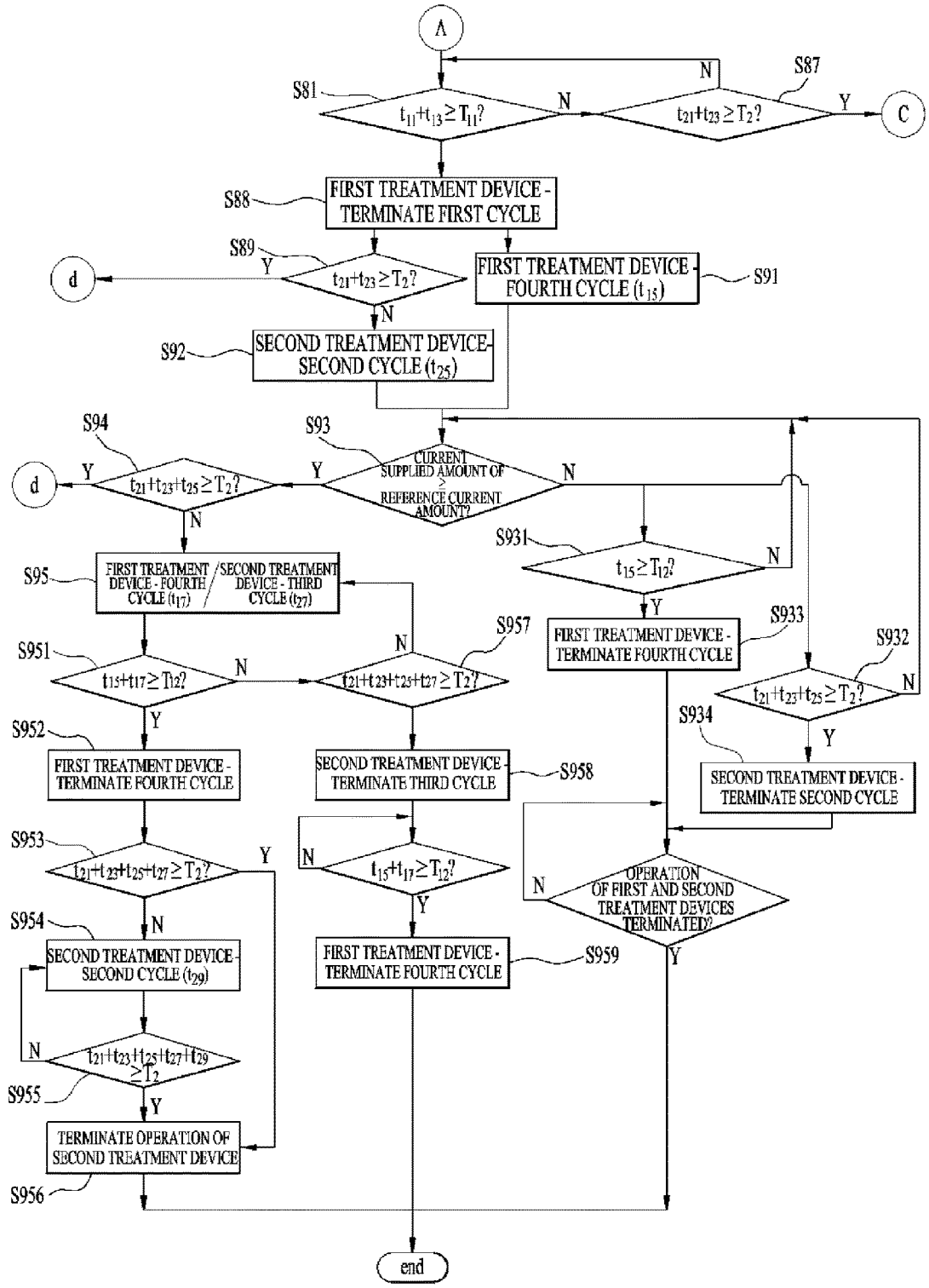

[Fig. 5]
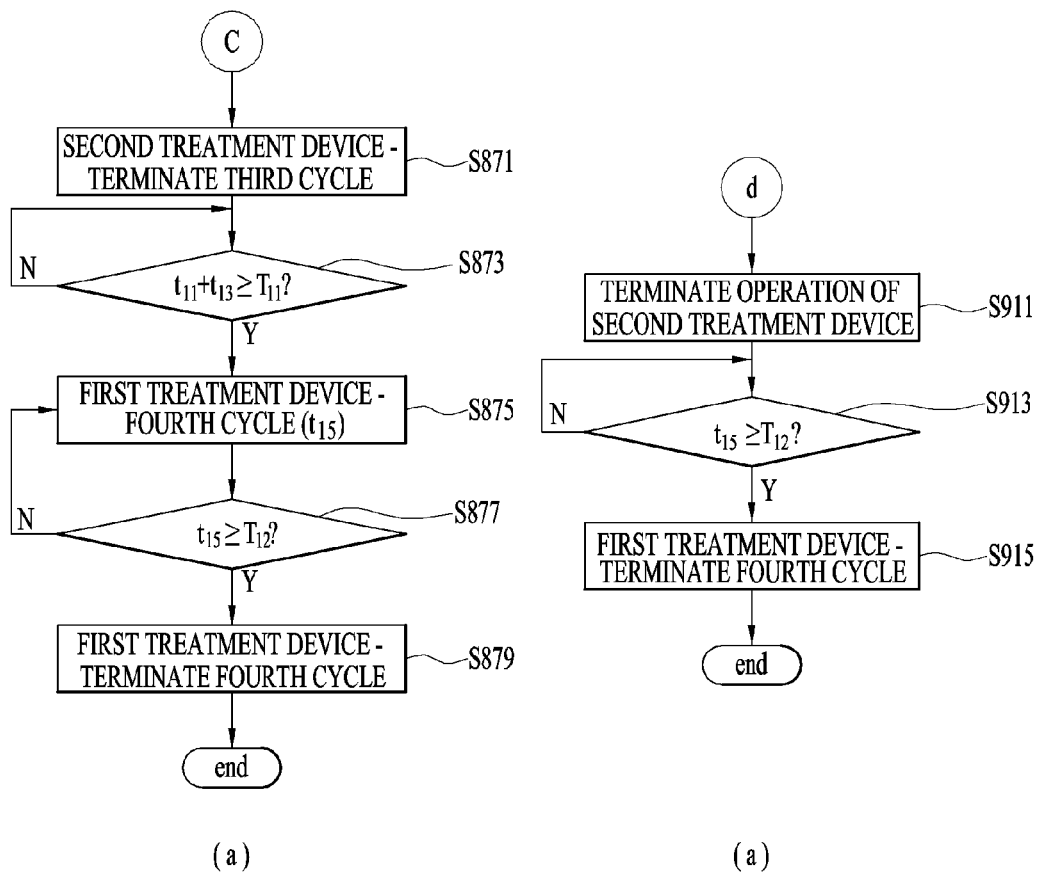

[Fig. 6]
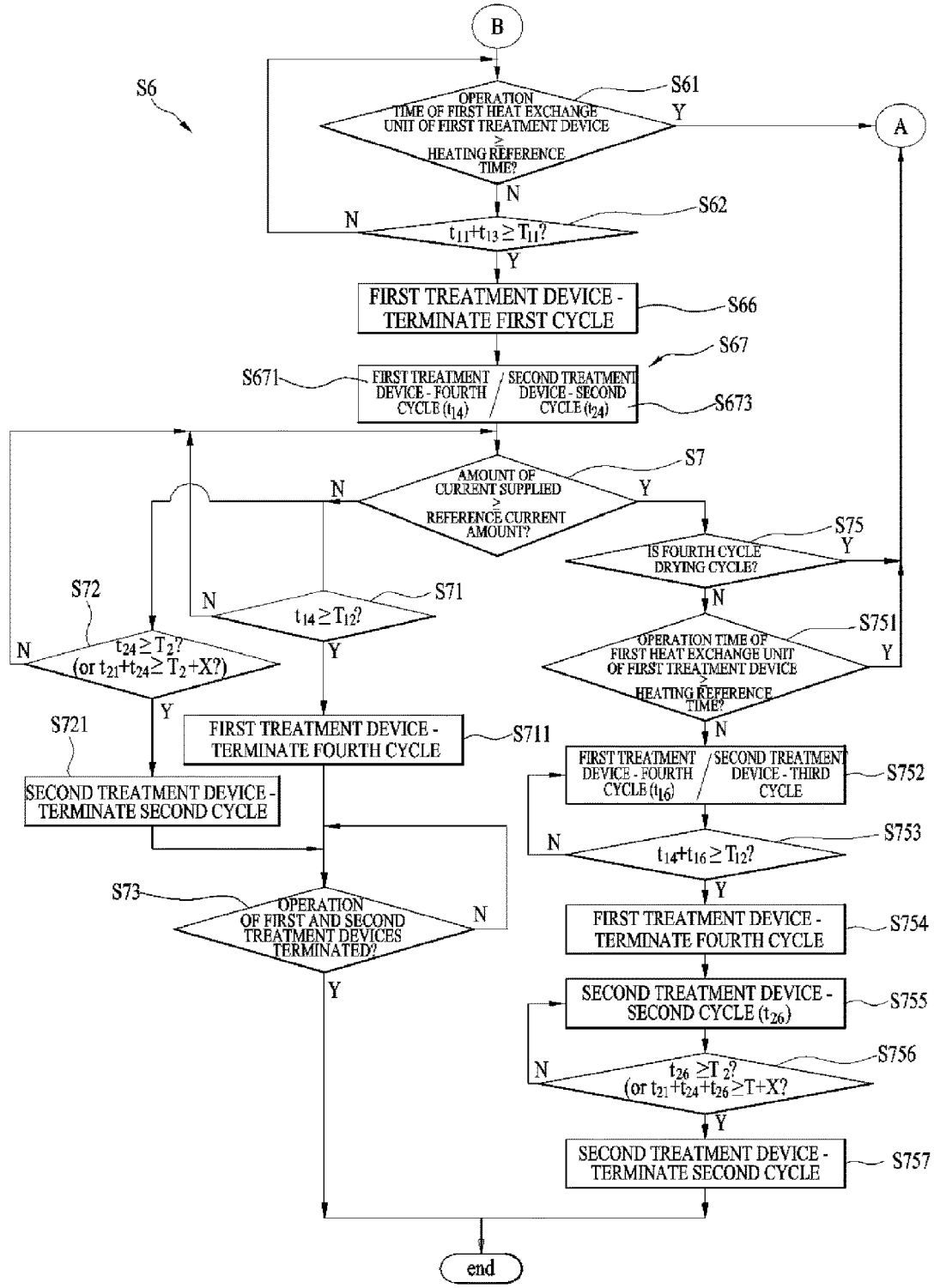

CONTROL METHOD OF LAUNDRY TREATMENT APPARATUS

This application is a National Stage Application of International Application No. PCT/KR2016/001709, filed on Feb. 22, 2016, which claims the benefit of Korean Patent Application No. 10-2015-0025106, filed on Feb. 23, 2015, all of which are hereby incorporated by reference in their entirety for all purposes as if fully set forth herein.

TECHNICAL FIELD

The present invention relates to a control method of a laundry treatment apparatus.

BACKGROUND ART

In general, a laundry treatment apparatus is a concept including an apparatus for washing laundry, an apparatus for drying laundry, and an apparatus for washing and drying laundry.

In a front loading type laundry treatment apparatus (for example, a drum type washing machine), in which laundry is introduced into the laundry treatment apparatus through the front thereof, an introduction port, through which laundry is introduced into the laundry treatment apparatus, is lower than the waist of a user, with the result that the user must stoop to introduce laundry into the laundry treatment apparatus or to remove laundry from the laundry treatment apparatus, which is inconvenient.

In order to overcome this inconvenience, some conventional front loading type laundry treatment apparatuses are provided with an auxiliary laundry treatment apparatus, which is disposed under the laundry treatment apparatus in order to increase the height of the introduction port of the laundry treatment apparatus. In addition, the auxiliary laundry treatment apparatus also performs a function of treating (for example, washing or drying) laundry.

When the conventional laundry treatment apparatus and the auxiliary laundry treatment apparatus are simultaneously operated, however, one of the laundry treatment apparatuses cannot be aware of the amount of current per unit time that is consumed by the other. For this reason, when the laundry treatment apparatus and the auxiliary laundry treatment apparatus are simultaneously operated, the operation of both the laundry treatment apparatus and the auxiliary laundry treatment apparatus may be interrupted due to overcurrent.

DISCLOSURE OF INVENTION

Technical Problem

An object of the present invention devised to solve the problem lies in a control method of a laundry treatment apparatus including at least two treatment devices (for example, a dryer, a washer, a washer and dryer, etc.) for treating laundry.

Another object of the present invention devised to solve the problem lies in a control method of a laundry treatment apparatus that is capable of preventing the operation of a first treatment device and a second treatment device for treating laundry from being simultaneously interrupted due to overcurrent when the two treatment devices are operated simultaneously.

Solution to Problem

The object of the present invention can be achieved by providing a control method of a laundry treatment apparatus including a first treatment device having a first load unit for treating laundry and a second treatment device having a second load unit for treating laundry, the control method including supplying electric power to the first load unit to execute a first cycle set in the first treatment device (a first step), supplying electric power to the second load unit to execute a second cycle set in the second treatment device (a second step), the second step being performed during performance of the first step, when the amount of current per unit time that is supplied to the laundry treatment apparatus is equal to or greater than a predetermined reference current amount, terminating the second step and executing a third cycle set in the second treatment device so as to consume a lower amount of current than the amount of current per unit time necessary to execute the second cycle (a third step), terminating the first cycle of the first treatment device (a fourth step), and executing the second cycle of the second treatment device after completing the fourth step (a fifth step), wherein whether to perform the fifth step and the performance time of the fifth step are determined based on the kind of the first cycle.

When the first cycle is a cycle for supplying heated air to treat the laundry, the fifth step may be performed only when the sum of the performance time of the second step and the performance time of the third step is less than a predetermined second cycle reference time or when the performance time of the third step is less than the second cycle reference time.

When the performance time of the second step is greater than a second reference time set so as to be less than the second cycle reference time, the fifth step may be performed until the sum of the performance time of the second step, the performance time of the third step, and the performance time of the fifth step reaches the second cycle reference time.

When the performance time of the second step is less than a second reference time set so as to be less than the second cycle reference time, the fifth step may be performed until the sum of the performance time of the third step and the performance time of the fifth step reaches the second cycle reference time.

When the first cycle is a cycle for treating the laundry using water, the fifth step may be terminated when the execution time of the second cycle at the fifth step reaches a predetermined second cycle reference time, when the sum of the execution time of the second cycle in the second step and the execution time of the second cycle in the fifth step reaches the second cycle reference time, or when the sum of the execution time of the second cycle in the second step and the execution time of the second cycle in the fifth step reaches a time obtained by adding a predetermined additional time to the second cycle reference time.

The control method may further include supplying electric power to the first load unit to execute a fourth cycle set in the first treatment device after completing the fourth step (a sixth step), the sixth step being performed during performance of the fifth step, and, when the amount of current per unit time that is supplied to the laundry treatment apparatus during performance of the fifth step and the sixth step is equal to or greater than the reference current amount, terminating the fifth step and executing the third cycle of the second treatment device (a seventh step).

The control method may further include terminating the sixth step (an eighth step) and terminating the seventh step and executing the second cycle of the second treatment device (a ninth step).

The ninth step may be terminated when the sum of continuous execution times of the second cycle in the ninth step reaches the second cycle reference time or when the sum of the execution time of the second cycle in the second step, the execution time of the second cycle in the fifth step, and the execution time of the second cycle in the ninth step reaches the second cycle reference time.

The ninth step may be terminated when the sum of the execution time of the second cycle in the second step, the execution time of the second cycle in the fifth step, and the execution time of the second cycle in the ninth step reaches a time obtained by adding a predetermined additional time to the second cycle reference time.

The additional time may be set so as to be proportional to at least one selected from between the performance time of the third step and the performance time of the seventh step or to be inversely proportional to at least one selected from between the performance time of the second step and the performance time of the fifth step.

When the number of times that the second cycle was executed is equal to or greater than a predetermined reference number of times, the fifth step may be commenced when the sum of the performance time of the second step and the performance time of the third step is less than the second cycle reference time or when the performance time of the third step is less than the second cycle reference time, and the fifth step may be continued until the sum of the performance time of the second step, the performance time of the third step, and the performance time of the fifth step reaches the second cycle reference time or until the sum of the performance time of the third step and the performance time of the fifth step reaches the second cycle reference time.

When the operation time of a heat exchange unit provided in the first load unit for heating a fluid is equal to or greater than a predetermined heating reference time, the fifth step may be commenced when the sum of the performance time of the second step and the performance time of the third step is less than the second cycle reference time or when the performance time of the third step is less than the second cycle reference time, and the fifth step may be continued until the sum of the performance time of the second step, the performance time of the third step, and the performance time of the fifth step reaches the second cycle reference time or until the sum of the performance time of the third step and the performance time of the fifth step reaches the second cycle reference time.

When the amount of current per unit time that is supplied to the first treatment device is equal to or greater than the amount of current per unit time necessary to operate a heat exchange unit provided in the first load unit in order to heat a gas, the first cycle may be determined to be a cycle for supplying heated air to treat the laundry, and, when the amount of current per unit time that is supplied to the first treatment device is less than the amount of current per unit time necessary to operate the heat exchange unit, the first cycle may be determined to be a cycle for supplying water to treat the laundry.

When the increase in the amount of current that is supplied to the first treatment device for a predetermined time is less than a predetermined reference value, the first cycle may be determined to be a cycle for supplying water to treat the laundry, and, when the increase in the amount of current that is supplied to the first treatment device for the predetermined time is greater than the reference value, the first cycle may be determined to be a cycle for supplying heated air to treat the laundry.

When a period of fluctuation in the amount of current per unit time that is supplied to the first treatment device is shorter than a predetermined reference period, the first cycle may be determined to be a cycle for supplying heated air to treat the laundry, and, when the period of fluctuation in the amount of current per unit time that is supplied to the first treatment device is longer than the reference period, the first cycle may be determined to be a cycle for supplying water to treat the laundry.

Whether the amount of current per unit time that is supplied to the laundry treatment apparatus is equal to or greater than the reference current amount may be determined by determining whether the amount of current per unit time that is supplied to the first treatment device is equal to or greater than the reference current amount.

The reference current amount may be set as one selected from between the amount of current per unit time necessary to operate a first heat exchange unit provided in the first load unit in order to heat a fluid and the amount of current per unit time necessary to operate a second heat exchange unit provided in the first load unit in order to heat a gas.

Whether the amount of current per unit time that is supplied to the laundry treatment apparatus is equal to or greater than the reference current amount may be determined by determining whether the sum of the amount of current per unit time that is supplied to the first treatment device and the amount of current per unit time that is supplied to the second treatment device is equal to or greater than the reference current amount.

The weight of the laundry that can be treated by the first treatment device may be higher than that of the laundry that can be treated by the second treatment device.

The first step and the second step may be commenced simultaneously, or one selected from between the first step and the second step may be commenced earlier than the other.

Advantageous Effects of Invention

As is apparent from the above description, the present invention has the effect of providing a control method of a laundry treatment apparatus including at least two treatment devices (for example, a dryer, a washer, a washer and dryer, etc.) for treating laundry.

In addition, the present invention has the effect of providing a control method of a laundry treatment apparatus that is capable of preventing the operation of a first treatment device and a second treatment device for treating laundry from being simultaneously interrupted due to overcurrent when the two treatment devices are operated simultaneously.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a view showing an embodiment of a laundry treatment apparatus according to the present invention;

FIG. 2 is a view showing an embodiment of a control method of a laundry treatment apparatus according to the present invention; and FIGS. 3 to 6 are views showing another embodiment of a control method of a laundry treatment apparatus according to the present invention.

BEST MODE FOR CARRYING OUT THE INVENTION

Reference will now be made in detail to the preferred embodiments of the present invention, examples of which are illustrated in the accompanying drawings. It should be noted herein that these embodiments are only for illustrative purposes and the protection scope of the invention is not limited thereto. Wherever possible, the same reference numbers will be used throughout this specification to refer to the same or like parts.

FIG. 1 is a view showing an embodiment of a laundry treatment apparatus according to the present invention.

A laundry treatment apparatus 100 according to the present invention includes a first treatment device 1 for treating (for example, washing, drying, or washing and drying) laundry, a second treatment device 3 for providing an additional laundry treatment space that is separate from the first treatment device 1, and an electric power control device 5 for controlling electric power that is supplied to the first treatment device 1 and the second treatment device 3.

The first treatment device 1 includes a first cabinet 11 forming the external appearance thereof and a first receiving unit 13 defined in the first cabinet 11 for providing a laundry treatment space.

The first receiving unit 13 may include a first tub 131 for providing a water storage space and a first drum 133 provided in the first tub 131 for receiving laundry.

The first tub 131 and the first drum 133 communicate with an introduction port provided in the first cabinet 11. The introduction port is opened and closed by a door 111.

In the first tub 131 may be provided a first heat exchange unit 173 for heating wash water. Outside the first tub 131 may be provided a motor 171 for rotating the first drum 133.

A load (a first load unit) 17 of the first treatment device 1 having the above-described structure is constituted by the motor 171 and the first heat exchange unit 173 (here, "load" refers to an object to which electric power from a power supply is supplied).

Meanwhile, in a case in which the first treatment device 1 of the present invention is configured as a device that is also capable of drying laundry, a duct 15 for supplying heated air to the first tub 131 may be provided in the first cabinet 11.

In a case in which the duct 15 is configured as a flow channel for circulating air in the first tub 131, a second heat exchange unit 175 and a fan 177 may be provided in the duct 15.

The second heat exchange unit 175 may be configured as a device (for example, a heat pump) for removing moisture from air discharged from the first tub 131 and, additionally, for heating the dried air. In this case, the first load unit 17 may be constituted by the motor 171, the first heat exchange unit 173, the second heat exchange unit 175, and the fan 177.

Meanwhile, in a case in which the duct 15 includes a first duct for supplying the heated air into the first tub 131 and a second duct for discharging the air in the first tub 131 out of the first cabinet, the second heat exchange unit 175 (for example, a heat pump or a heater for emitting heat when electric power is supplied thereto) may be provided in the first duct, and the fan 177 may be provided in the second duct.

The operation of the first load unit 17 is controlled by a first control unit 18. Electric power is supplied to the first load unit 17 and the first control unit 18 via a first electric power cable 19.

The second treatment device 3 includes a second cabinet 31 located under the first cabinet 11 for supporting the first treatment device 1 and a second receiving unit 33 defined in the second cabinet 31 for providing a laundry receiving space.

The second receiving unit 33 may include a second tub 331 removably provided in the second cabinet 31 and a second drum 333 provided in the second tub 331 for receiving laundry.

In a case in which the second treatment device 3 is a configured as a laundry washing machine, the second tub 331 may be configured to store water.

In the second tub 331 may be provided a heater 353 for heating water (a device for emitting heat when electric power is supplied thereto). Outside the second tub 331 may be provided a driving unit 351 for rotating the second drum 333.

In this case, a load (a second load unit) 35 of the second treatment device 3 may be constituted by the driving unit 351 and the heater 353. The operation of the second load unit 35 is controlled by a second control unit 38. Electric power is supplied to the second load unit 35 and the second control unit 38 via a first electric power cable 39.

Electric power is supplied to the first treatment device 1 and the second treatment device 3 via the electric power control device 5. The electric power control device 5 is a device that notifies at least one selected from between the first control unit 18 and the second control unit 38 whether the amount of current per unit time that is supplied to the first treatment device 1 is equal to or greater than a predetermined reference current amount.

Elements that are directed by the electric power control device 5 to control the amount of current per unit time that is supplied to the laundry treatment apparatus may be determined based on the laundry treatment capacities of the respective treatment devices 1 and 3 or the importance of a laundry treatment cycle (or a laundry treatment course) that is being executed by each treatment device.

In FIG. 1, it is assumed that the laundry treatment capacity of the first treatment device 1 is greater than that of the second treatment device 3. In the following description, it is assumed that the electric power control device 5 notifies the second control unit 38 that it is necessary to control the amount of current that is supplied to the second load unit 35.

The electric power control device 5 may include an input unit 52 for receiving electric power from a power supply 7, a first attachment and detachment unit 53, to which the first electric power cable 19 is removably coupled, for electrically connecting the first electric power cable 19 to the input unit 52, a second attachment and detachment unit 54, to which the second electric power cable 39 is removably coupled, for electrically connecting the second electric power cable 39 to the input unit 52, and electric power control units 55, 57, 591, and 593 for notifying the second treatment device 3 that the amount of current per unit time supplied to the first treatment device 1 has reached the reference current amount, when the amount of current per unit time supplied to the first treatment device 1 has reached the reference current amount, such that the second control unit 38 can control the operation of the second load unit 35.

The electric power control device 5 may be removably provided at the power supply 7. Alternatively, the electric power control device 5 may be fixedly provided at the power supply 7. In the former case, a housing 51, to which the input unit 52 is fixed, may be removable from the power supply 7. In the latter case, the housing 51 may be fixed in a room 9, and therefore the power supply 7 may be the input unit 52.

The first attachment and detachment unit 53 may include first connection cables 531*a* and 531*b* for connecting pins provided in the first electric power cable 19 to pins of the input unit 52. The first attachment and detachment unit 53 may be provided in the housing 51.

The second attachment and detachment unit 54 may include second connection cables 541a and 541b for connecting pins provided in the second electric power cable 39 to the pins of the input unit 52. The second attachment and detachment unit 54 may be provided in the housing 51. Meanwhile, the second connection cables 541a and 541b may diverge from the first connection cables 531a and 531b, respectively.

The electric power control units may include a sensing unit 55 for measuring the amount of current per unit time that is supplied to the first attachment and detachment unit 53, a control unit 57 for determining whether the amount of current per unit time measured by the sensing unit 55 is equal to or greater than the reference current amount, and a communication unit for transmitting a signal indicating whether the amount of current per unit time that is supplied to the first attachment and detachment unit 53 is equal to or greater than the reference current amount to the second treatment device 3.

The communication unit may communicate with the second treatment device 3 in a wired communication fashion. Alternatively, the communication unit may communicate with the second treatment device 3 in a wireless communication fashion.

In the former case, the communication unit may include a communication cable for directly connecting the control unit 57, which is provided in the electric power control device 5, with the second control unit 38, which is provided in the second treatment device 3. In the latter case, the communication unit may include a first communication unit 591 connected to the control unit 57 and a second communication unit 593 connected to the second control unit 38.

In any case, when the second communication unit 593 receives a signal transmitted by the first communication unit 591, the second control unit 38 may temporarily interrupt the overall operation of the second load unit 35, or may interrupt the operation of some of the loads constituting the second load unit 35.

The power supply 7, which is located in the room, is generally connected to an electric power cutoff device (not shown), which is configured to interrupt the supply of electric power to the power supply 7, when the amount of current per unit time that is supplied to electric home appliances through the power supply 7 exceeds a predetermined value, thereby preventing the occurrence of a fire. In a general laundry treatment apparatus, therefore, electric power from the power supply 7 may not be supplied to the input unit 52 due to the electric power cutoff device (not shown) when the first load unit 17 and the second load unit 35 are simultaneously operated.

If the supply of electric power to the input unit 52 is interrupted during the operation of the first treatment device 1 and the second treatment device 3, the operation of both the first treatment device 1 and the second treatment device 3 is interrupted. For this reason, it is necessary to operate only one selected from between the first treatment device 1 and the second treatment device 3, which is inconvenient. Furthermore, the laundry treatment course that was being performed before the supply of electric power is interrupted must be commenced again from the beginning.

However, the electric power control device 5 of the present invention may control the second load unit 35 in order to reduce the amount of current per unit time that is supplied to the second treatment device 3, when the amount of current per unit time supplied to the first treatment device 1 has reached the reference current amount during the simultaneous operation of the first treatment device 1 and the second treatment device 3, such that the laundry treatment course that is being performed by the first treatment device 1 can be completed.

For example, in a case in which the first treatment device 1 is performing a laundry treatment course using the first heat exchange unit 173 or the second heat exchange unit 175 and the second treatment device 3 is performing a laundry treatment course using the heater 353, the amount of current per unit time that is supplied to the laundry treatment apparatus 100 through the power supply 7 may reach a level at which the electric power cutoff device (not shown) can operate. This is because loads provided in the laundry treatment apparatus 100 that require the greatest amount of current are heat exchange units.

When the reference current amount is set to a value between the amount of current per unit time that is necessary to operate at least one selected from between the first heat exchange unit 173 and the second heat exchange unit 175, provided in the first treatment device 1, and the amount of current per unit time that is necessary to operate the electric power cutoff device (not shown), therefore, it may be possible for the laundry treatment apparatus 100 according to the present invention to prevent the operation of the first treatment device 1 and the second treatment device 3 from being simultaneously interrupted.

Meanwhile, the sensing unit 55 is provided in order to measure the amount of current per unit time that is supplied to the first treatment device 1 on the assumption that, in a case in which the laundry treatment capacity of the first treatment device 1 is greater than that of the second treatment device 3, as previously described, a laundry treatment course that is performed by the first treatment device 1 has priority over a laundry treatment course that is performed by the second treatment device 3.

Consequently, the sensing unit 55 may be provided in order to measure the amount of current per unit time that is supplied to the second treatment device 3, the control unit 57 may be provided in order to notify the first control unit 18 that the amount of current per unit time that is supplied to the second treatment device 3 is equal to or greater than the reference current amount when the amount of current per unit time that is supplied to the second treatment device 3 is equal to or greater than the reference current amount, and the first control unit 18 may be provided in order to control the first load unit 17 in order to reduce the amount of current per unit time that is supplied to the first load unit 17.

Furthermore, when the sum of the amount of current per unit time that is supplied to the first treatment device 1 and the amount of current per unit time that is supplied to the second treatment device 3 is equal to or greater than the reference current amount, the sensing unit 55 may notify at least one selected from between the first control unit 18 and the second control unit 38 that the sum of the amount of current per unit time that is supplied to the first treatment device 1 and the amount of current per unit time that is supplied to the second treatment device 3 is equal to or greater than the reference current amount. In this case, the sensing unit 55 may be provided at a position at which it is possible to measure the amount of current per unit time that is supplied to the first attachment and detachment unit 53 and the amount of current per unit time that is supplied to the second attachment and detachment unit 54.

Meanwhile, if the operation of one selected from between the first treatment device 1 and the second treatment device 3, which are operating, is interrupted by the electric power control device 5, a user may suspect that the device that stopped operating has broken down.

In order to prevent the operation of both the two treatment devices 1 and 3 from being interrupted, therefore, it is necessary to make the user recognize that the second treatment device 3 has been interrupted or has changed the laundry treatment course. To this end, the electric power control device 5 may be further provided with a display unit 58 for indicating that the second treatment device 3 has changed the laundry treatment course when the second treatment device 3 has changed the laundry treatment course.

The display unit 58 may indicate on the outside that the laundry treatment course that was being performed by the second treatment device 3 has been changed in order to prevent the occurrence of an accident due to overcurrent. That is, the display unit 58 may include a first display unit 581 for emitting light when the second treatment device 3 is treating laundry without any change in the laundry treatment course and a second display unit 583 for emitting light when the laundry treatment course of the second treatment device 3 has been changed.

Although, in the embodiment of FIG. 1, the control unit 57 of the electric power control device 5 and the second control unit 38 of the second treatment device 3 are provided separately from each other, one selected from between the control unit 57 and the second control unit 38 may be omitted. That is, the control unit 57 may be configured so as to function as the second control unit 38, or the second control unit 38 may be configured so as to function as the control unit 57.

Meanwhile, although, in the embodiment of FIG. 1, the electric power control device 5 is provided separately from the laundry treatment apparatus 100, the electric power control device 5 may be mounted in the laundry treatment apparatus 100.

In this case, the laundry treatment apparatus 100 according to the present invention may be configured such that the first control unit 18 and the second control unit 38 directly communicate with each other and such that the sensing unit 55 for measuring the amount of current per unit time that is supplied to the laundry treatment apparatus 100 may be provided in one selected from between the first treatment device 1 and the second treatment device 3.

FIG. 2 is a view showing an embodiment of a control method of a laundry treatment apparatus according to the present invention.

The control method according to the present invention may be commenced by the user supplying electric power to the laundry treatment apparatus 100 and inputting at least one selected from among a plurality of laundry treatment courses (hereinafter, simply referred to as courses) set in the respective treatment devices 1 and 3 to the respective treatment devices 1 and 3.

The courses set in the respective treatment devices 1 and 3 may be input to the respective treatment devices 1 and 3 through a control command input unit (not shown), such as a control panel.

Meanwhile, each course may include one or more cycles that are coupled to each other in a time series fashion. Each cycle means a time series control signal that the control units 18 and 38 transmit to the first load unit 17 and the second load unit 35, respectively, in order to supply air (or moisture) to laundry, or a time series control signal that the control units 18 and 38 transmit to the first load unit 17 and the second load unit 35, respectively, in order to rotate the drums 133 and 333, in which the laundry is received.

For example, it is assumed that a certain course set in the first treatment device 1 includes a process of supplying wash water into the first tub 131, a process of rotating the first drum 133, and a process of draining the wash water from the first tub 131. In this case, the course may include a water supply cycle for supplying wash water into the first tub 131, a foreign matter removal cycle for rotating the first drum 133, and a drainage cycle for draining the wash water from the first tub 131.

When courses to be performed by the respective treatment devices 1 and 3 are input to the respective treatment devices 1 and 3, the laundry treatment apparatus sets a performance time for each course. The course time set for each course may be determined based on the course input into each of the treatment devices and the weight of laundry to be treated by the respective treatment devices (the weight of laundry received in the respective drums).

Meanwhile, the course time means the execution time of each cycle constituting the course or the sum of the execution times of the cycles constituting the course. Therefore, the respective treatment devices 1 and 3 setting the course time means that the respective treatment devices 1 and 3 set the execution time of the cycles constituting each course (hereinafter, referred to as reference time).

When courses are input to the respective treatment devices 1 and 3, therefore, the control method according to the present invention performs a step (S1) of setting a reference time T1 of a cycle (a first cycle) to be executed by the first treatment device 1 and a reference time T2 of a cycle (a second cycle) to be executed by the second treatment device 3.

When the reference time of the first cycle (a first cycle of the first treatment device) and the reference time of the second cycle (a first cycle of the second treatment device) are set, the control method according to the present invention performs a step (S2) of commencing the operation of the respective treatment devices 1 and 3.

The step of commencing the operation of the respective treatment devices 1 and 3 may include a first step (S21) of supplying electric power to the first load unit 17 of the first treatment device 1 such that the first treatment device 1 executes the first cycle and a second step (S23) of supplying electric power to the second load unit 35 of the second treatment device 3 such that the second treatment device 3 executes the second cycle. The first step (S21) and the second step (S23) may be commenced simultaneously. Alternatively, one selected from between the first step (S21) and the second step (S23) may be commenced earlier than the other.

Meanwhile, the first load unit 17, which performs the first step (S21), and the second load unit 35, which performs the second step (S23), may be simultaneously operated, irrespective of when the first step (S21) and the second step (S23) are commenced. Consequently, the control method according to the present invention performs a step (S3) of determining whether the amount of current per unit time that is supplied to the laundry treatment apparatus 100, which is measured using the sensing unit 55, is equal to or greater than the predetermined reference current amount.

Whether the amount of current per unit time that is supplied to the laundry treatment apparatus 100 is equal to or greater than the reference current amount may be determined by comparing the sum of the amounts of current per unit time that are supplied to the respective treatment devices with the reference current amount, as previously described, or by comparing the amount of current per unit time that is supplied to one of the treatment devices 1 and 3 with the reference current amount.

In the former case, the reference current amount may be set to a value that is less than the amount of current that is necessary to operate the electric power cutoff device (not shown), which interrupts the supply of electric power to the power supply 7.

In the latter case, on the other hand, the reference current amount may be set to the amount of current that is necessary to operate one selected from among the loads constituting the first load unit 17 or the second load unit 35 that requires the greatest amount of current per unit time. This is because the electric power cutoff device (not shown) may operate when the load that requires the greatest amount of current per unit time is operated.

In general, the first heat exchange unit 173 or the second heat exchange unit 175, which constitutes the first load unit 17, requires the greatest amount of current per unit time, and the heater 353, which constitutes the second load unit 35, requires the greatest amount of current per unit time.

When the amount of current per unit time that is supplied to the first treatment device is compared with the reference current amount in step S3, therefore, the reference current amount may be set to the amount of current per unit time to be supplied to each heat exchange unit in order to operate the first heat exchange unit 173 or the second heat exchange unit 175.

When the amount of current per unit time that is supplied to the second treatment device is compared with the reference current amount in step S3, on the other hand, the reference current amount may be set to the amount of current per unit time to be supplied to the heater 353 in order to operate the heater 353.

Meanwhile, upon determining that the amount of current per unit time supplied to the laundry treatment apparatus 100 has reached the reference current amount, the control method according to the present invention performs a third step (S4) of maintaining the first cycle of the first treatment device, terminating the second cycle of the second treatment device, and executing a third cycle (another cycle of the second treatment device other than the second cycle).

In the third step (S4), the control unit 57 notifies the second control unit 38 that it is necessary to control the amount of current per unit time that is supplied to the second load unit 35, and the second control unit 38 controls the second load unit 35 in response to a signal from the control unit 57 such that the second treatment device executes the third cycle.

In this case, the third cycle (a second cycle of the second treatment device) may be set as a course that requires a lower amount of current per unit time than that necessary to execute the second cycle (a first cycle of the second treatment device). For example, in a case in which the second cycle is a cycle using the heater 353, the third cycle may be set as a cycle not using the heater 353.

When the amount of current per unit time supplied to the laundry treatment apparatus 100 has reached the reference current amount, the cycle of the second treatment device is switched (the contents of the course input to the second treatment device are changed) in order to reduce the amount of current per unit time that is supplied to the laundry treatment apparatus 100, thereby preventing the operation of both the first treatment device 1 and the second treatment device 3 from being interrupted by the electric power cutoff device (not shown).

Meanwhile, in order to prevent the interruption of electric power supplied to both the first treatment device 1 and the second treatment device 3, the supply of electric power to the second treatment device 3 may be interrupted. In this case, however, the second cycle of the second treatment device 3 must be resumed after the first cycle of the first treatment device 1 is terminated, with the result that the operation time of the laundry treatment apparatus 100 may be increased (the amount of electric power that is used may be increased).

In a case in which the operation of the second treatment device 3 is maintained by switching from the second cycle to the third cycle of the second treatment device 3 without interrupting the supply of electric power to the second treatment device 3, however, the laundry received in the second treatment device 3 may be treated (for example, washed or dried) through the third cycle. Therefore, even when the time necessary to execute the second cycle, which is resumed after the first cycle of the first treatment device 1 is terminated, is reduced, it may be possible to wash or dry the laundry to a desired extent.

During the execution of the first cycle of the first treatment device 1 and the third cycle of the second treatment device 3 (S4), the control method according to the present invention performs a step (S62 and S81) of determining whether the execution time of the first cycle has exceeded a predetermined first cycle reference time T1, a fourth step (S641 and S82) of terminating the first cycle of the first treatment device 1, and a fifth step (S633 and S84) of executing the second cycle of the second treatment device 3 after terminating the third cycle of the second treatment device 3.

Whether to perform the fifth step (S633 and S84) and the performance time of the fifth step (S633 and S84) may be controlled so as to be changed based on whether the first cycle of the first treatment device 1 is a washing cycle or a drying cycle.

To this end, the control method according to the present invention may perform a cycle determination step (S5) of determining the kind of the first cycle during the execution of the first cycle of the first treatment device 1 and the third cycle of the second treatment device 3 (during the performance of the third step (S4)).

The washing cycle is a cycle for supplying water into the first tub 131 to treat the laundry, and the drying cycle is a cycle for supplying air into the first tub 131 to treat the laundry.

In the present invention, the first heat exchange unit 173 is configured to heat water, and the second heat exchange unit 175 is configured to heat air (i.e. the heat exchange unit that is operated during the washing cycle and the heat exchange unit that is operated during the drying cycle are different from each other). Consequently, the amount of current per unit time that is supplied to the first treatment device 1 during the washing cycle may be distinguished from the amount of current per unit time that is supplied to the first treatment device 1 during the drying cycle.

In addition, the amount of current per unit time that is supplied to the second heat exchange unit 175 is generally greater than the amount of current per unit time that is supplied to the first heat exchange unit 173. Consequently, the amount of current per unit time that is supplied to the first treatment device 1 in order to execute the drying cycle may be less than the amount of current per unit time that is supplied to the first treatment device 1 in order to execute the washing cycle.

When the amount of current per unit time that is supplied to the first treatment device 1 is equal to or greater than the amount of current per unit time that is necessary to operate the second heat exchange unit 175, therefore, in the cycle determination step (S5), the first cycle of the first treatment device 1 may be determined to be a drying cycle for supplying heated air to treat the laundry. When the amount of current per unit time that is supplied to the first treatment device 1 is less than the amount of current per unit time that is necessary to operate the second heat exchange unit 175, on the other hand, in the cycle determination step (S5), the first cycle of the first treatment device 1 may be determined to be a washing cycle for supplying water to treat the laundry.

Meanwhile, the washing cycle and the drying cycle pass through a process of determining the weight of the laundry in order to set a reference time of each cycle. In the cycle determination step (S5), it may be possible to determine the kind of the first cycle that is executed by the first treatment device 1 using the laundry weight determination process.

The weight of the laundry (the laundry weight) received in the first drum 133 may be determined using various methods. The laundry weight may be determined based on the amount of current per unit time that is necessary to rotate the first drum 133 by a predetermined angle or a predetermined number of times.

In a case in which the same kind of laundry is received in the first drum 133, the amount of current per unit time that is supplied to the motor 171 during the washing cycle, during which it is necessary to determine the weight of dry laundry, is less than the amount of current per unit time that is supplied to the motor 171 during the drying cycle, during which it is necessary to determine the weight of wet laundry.

In order to determine the weight of the laundry received in the first drum 133, therefore, experimental data about the amount of current for each laundry weight to be supplied to the first treatment device 1 may be compared with the amount of current per unit time that is supplied to the first load unit when the first treatment device 1 carries out the laundry weight determination process, whereby it may be possible to determine whether the first cycle, executed by the first treatment device 1, is a washing cycle or a drying cycle.

However, the method of determining the kind of the first cycle as described above has the following problems.

It is assumed that the laundry weight is defined using levels (interval values having an upper limit and a lower limit) and that the amount of current per unit time that is supplied to the motor 171 when dry laundry having laundry weight equivalent to 1 level is received in the first drum 133 in a wet state is equal to the amount of current per unit time that is supplied to the motor 171 when dry laundry having laundry weight equivalent to 2 levels is received in the first drum 133.

In this case, it may be difficult to determine whether the first cycle of the first treatment device 1 is a washing cycle or a drying cycle using the above method. In this case, therefore, it is necessary to set the laundry weight level of laundry such that the laundry weight level of wet laundry and the laundry weight level of dry laundry when the laundry is wet do not overlap each other.

Meanwhile, the laundry may be washed through a process of determining the weight of the laundry, a process of rotating the first drum 133, and a process of heating the water stored in the first tub 131. On the other hand, the laundry may be dried through a process of determining the weight of the wet laundry, a process of rotating the first drum 133, and a process of supplying heated air into the first tub 131.

When the amount of current per unit time that is supplied to the first treatment device 1 is changed to the amount of current per unit time that is necessary to operate the first heat exchange unit 173 or more, therefore, the first cycle is determined to be a washing cycle in the cycle determination step (S5). When the amount of current per unit time that is supplied to the first treatment device 1 is changed to the amount of current per unit time that is necessary to operate the second heat exchange unit 175 or more, on the other hand, the first cycle is determined to be a drying cycle at the cycle determination step (S5).

As previously described, in the laundry weight determination process, the amount of current per unit time that is supplied to the motor 171 in order to execute the washing cycle is distinguished from the amount of current per unit time that is supplied to the motor 171 in order to execute the drying cycle, and the amount of current per unit time that is necessary to operate the first heat exchange unit 173 is distinguished from the amount of current per unit time that is necessary to operate the second heat exchange unit 175.

Consequently, it may be possible to determine the kind of the first cycle by determining whether the amount of current per unit time measured by the sensing unit 55 is increased from a first current amount (the amount of current per unit time that is necessary to determine the laundry weight for the washing cycle) to a third current amount (the amount of current per unit time that is necessary to operate the first heat exchange unit) or from a second current amount (the amount of current per unit time that is necessary to determine the laundry weight for the drying cycle) to a fourth current amount (the amount of current per unit time that is necessary to operate the second heat exchange unit).

Generally, in a case in which laundry having the same weight is received in the first drum 133, the second current amount may be greater than the first current amount, and the third current amount may be greater than the second current amount and less than the fourth current amount.

Meanwhile, since the first heat exchange unit 173, which heats water, or the second heat exchange unit 175, which heats air, has rated current, it is not possible to infinitely increase the output of each heat exchange unit even if the amount of a fluid to be heated or the laundry weight is large.

This means that the amount of current per unit time that can be supplied to the first heat exchange unit 173 or the second heat exchange unit 175 has an upper limit, and therefore, when the process is changed from the laundry weight determination process to the process of operating the respective heat exchange units, the maximum variation in the amount of current per unit time during the washing cycle is distinguishable from the maximum variation in the amount of current per unit time during the drying cycle.

When a reference value is set so as to distinguish between the increase (or the rate of increase) in the amount of current per unit time between the first current amount and the third current amount and the increase (or the rate of increase) in the amount of current per unit time between the second current amount and the fourth current amount, therefore, it may be possible to determine the kind of the first cycle by comparing the reference value with a measured inclination in the cycle determination step (S5).

Furthermore, in the cycle determination step (S5), it may be possible to determine the kind of the first cycle based on the period of fluctuation in the amount of current per unit time that is supplied to the first treatment device 1.

In order to prevent overheating, the first heat exchange unit 173 and the second heat exchange unit 175 are generally controlled to be turned ON and OFF based on the temperature of a fluid that is heated or the temperature of each heat exchange unit. ON and OFF control is performed such that, when the temperature of the fluid or of each heat exchange unit has reached a predetermined temperature, the supply of electric power to each heat exchange unit is interrupted, and, when the temperature of the fluid or of each heat exchange unit is less than the predetermined temperature, the supply of electric power to each heat exchange unit is resumed.

In general, since the ON and OFF period of the first heat exchange unit 173, which heats water during the washing cycle, is longer than that of the second heat exchange unit 175, which heats air during the drying cycle, the period of fluctuation in the amount of current per unit time that is supplied to the first treatment device 1 during the washing cycle may be longer than the period of fluctuation in the amount of current per unit time that is supplied to the first treatment device 1 during the drying cycle, and the number of fluctuations in the amount of current per unit time that is supplied to the first treatment device 1 at the washing cycle may be less than the number of fluctuations in the amount of current per unit time that is supplied to the first treatment device 1 during the drying cycle.

When the period of fluctuation in the amount of current per unit time that is supplied to the first treatment device 1 is shorter than a predetermined reference period, therefore, it may be determined in the cycle determination step (S5) that the first cycle is a drying cycle. When the period of fluctuation in the amount of current per unit time that is supplied to the first treatment device 1 is longer than the reference period, on the other hand, it may be determined in the cycle determination step (S5) that the first cycle is a washing cycle.

In addition, when the number of fluctuations in the amount of current per unit time that is supplied to the first treatment device 1 is greater than a predetermined reference number of times, it may be determined in the cycle determination step (S5) that the first cycle is a drying cycle. When the number of fluctuations in the amount of current per unit time that is supplied to the first treatment device 1 is less than the reference number of times, on the other hand, it may be determined in the cycle determination step (S5) that the first cycle is a washing cycle.

Upon determining the kind of the first cycle (S5) using the above methods, the control method according to the present invention controls the laundry treatment apparatus 100 in one mode selected from between two modes S6 and S8.

A first mode (also referred to as a motion shift mode) (S6) is a mode of controlling the second treatment device such that the second cycle is executed for a predetermined second cycle reference time T2 or longer. The first mode (S6) may be set so as to be performed in a case in which the first cycle is a washing cycle.

A second mode (also referred to as a motion hybrid mode) (S8) is a mode of controlling the operation of the second treatment device to be interrupted when the sum of the time for which the second treatment device was operated has reached the second cycle reference time T2, irrespective of whether the second cycle has been executed for the second cycle reference time T2.

In general, the second mode (S8) may be set so as to be performed in a case in which the first cycle is a drying cycle, in consideration of the fact that the amount of current per unit time required during the drying cycle is greater than the amount of current per unit time required during the washing cycle.

Hereinafter, the second mode (S8) will be described first, and then the first mode (S6) will be described.

As shown in FIG. 2, upon determining in the cycle determination step (S5) that the first cycle executed by the first treatment device is a drying cycle, in the second mode (S8), it is determined whether the time for which the first cycle of the first treatment device was executed has reached the first cycle reference time T1 (S81). That is, in the second mode (S8), it is periodically determined whether the sum (t11+t13) of the time for which the first step (S21) was performed and the time for which the third step (S4) was performed has reached the first cycle reference time T1 (S81).

Upon determining that the time for which the first cycle was executed has not reached the first cycle reference time T1, in the second mode (S8), it is periodically determined whether the time for which the second treatment device was operated has reached the second cycle reference time T2 (S87), and, if so, the second cycle is terminated (or the operation of the second treatment device is terminated) (S88).

The time for which the second treatment device was operated may be set to the sum (t21+t23) of the time for which the second step (S23) was performed and the time for which the third step (S4) was performed or to only the time (t23) for which the third step (S4) was performed.

In a case in which the time (t21) for which the second cycle of the second treatment device was executed (the time for which the second step (S23) was performed) is greater than a predetermined second reference time (a time set to a value less than the second cycle reference time), the time for which the second treatment device was operated may be set to the sum of the time (t21) for which the second step (S23) was performed and the time (t23) for which the third step (S4) was performed.

In a case in which the time (t21) for which the second cycle of the second treatment device was executed is less than the second reference time, on the other hand, the time for which the second treatment device was operated may be set to only the time (t23) for which the third step (S4) was performed.

The second mode (S8) is characterized in that, if there is a possibility that the electric power cutoff device will be operated even in a case in which the user inputs a control command to the second treatment device such that the second cycle is executed for the reference time T2, the second cycle is switched to the third cycle, and when the sum of the time for which the second treatment device was operated has reached the second cycle reference time T2, the operation of the second treatment device is interrupted.

This control is possible since it is possible to treat (for example, wash or dry) laundry to such an extent that the user is satisfied, even using the third cycle. When the time (t21) for which the second cycle of the second treatment device was executed is short, therefore, the time for which the laundry was treated through the second treatment device may be set to the time for which the second treatment device was operated excluding the time for which the second cycle was executed (i.e. the time (t23) for which the third cycle was executed) such that desired washing or drying is possible through the second cycle.

When the operation of the second treatment device is terminated (S88), in the second mode (S8), the time for which the first cycle of the first treatment device was executed is compared with the first cycle reference time T1, and then the operation of the first treatment device is also terminated (S89).

Meanwhile, when, during the performance of the third step (S4), the time for which the first cycle of the first treatment device was executed has first reached the first cycle reference time T1 (S81), in the second mode (S8), a fourth step (S82) of terminating the first cycle of the first treatment device is performed.

When the operation of the first treatment device is terminated as the result of performing the fourth step (S82), in the second mode (S8), it is determined whether the time (t21+t23 or t23) for which the second treatment device was operated has reached the second cycle reference time T2 (S83).

Upon determining that the time for which the second treatment device was operated has reached the second cycle reference time T2, in the second mode (S8), the operation of the second treatment device is terminated (S86). On the other hand, upon determining that the time for which the second treatment device was operated has not reached the second cycle reference time T2, in the second mode (S8), a fifth step (S84) of resuming the second cycle of the second treatment device is performed.

During the performance of the fifth step (S84), it is determined whether the sum of the time (t21) for which the second step was performed, the time (t23) for which the third step was performed, and a time (t25) for which the fifth step was performed has reached the second cycle reference time T2, and, if so, the operation of the second treatment device is terminated (S86).

However, if the time (t21) for which the second step was performed is less than the second reference time, in the second mode (S8), the operation of the second treatment device may be terminated (S86) when the sum (t23+t25) of the time for which the third step was performed and the time for which the fifth step was performed has reached the second cycle reference time T2.

Meanwhile, upon determining in the cycle determination step (S5) that the first course of the first treatment device is a washing cycle, the laundry treatment apparatus 100 according to the present invention is controlled in the first mode (S6).

In the first mode (S6), it is periodically determined whether the time (t11+t13) for which the first cycle of the first treatment device was executed has reached the first cycle reference time T1 (S62), and a fourth step (S631) of terminating the operation of the first treatment device is performed.

When the operation of the first treatment device is terminated as the result of performing the fourth step, in the first mode (S6), a fifth step (S633) of terminating the third cycle and executing the second cycle of the second treatment device is performed.

During the performance of the fifth step (S633), it is determined whether a time (t24) for which the second cycle of the second treatment device was continuously executed has reached the second cycle reference time T2 (S64), and, if so, the operation of the second treatment device is terminated (S65).

However, the fifth step (S633) may be performed until the sum (t21+t24) of the time for which the second cycle was executed in the second step (S23) and the fifth step (S633) reaches a modified reference time T2+x.

The modified reference time T2+x is a time obtained by adding an additional time x to the second cycle reference time T2 set before commencement of the second step (S23).

The additional time x is added to the second cycle reference time T2 in order to prevent the occurrence of a problem whereby laundry is not treated (for example, washed or dried) to a desired extent as the result of the second cycle of the second treatment device not being continuously executed for the second cycle reference time T2.

In a case in which the second cycle of the second treatment device is a cycle for washing laundry with water heated using the heater 353, heat is not continuously supplied to the laundry received in the second treatment device 3 for the second cycle reference time T2 but is discontinuously supplied to the laundry received in the second treatment device 3 in the second step (S23) and the fifth step (S633). As a result, the temperature of the water supplied to the second treatment device may not increase to a temperature necessary to execute the second cycle.

The additional time x is provided in order to minimize this phenomenon. In a case in which the fifth step (S633) is performed for the modified reference time T2+x, it is possible to heat the water stored in the second tub 331 for a longer time, thereby minimizing the above problem.

The additional time x may be set so as to increase in proportion to the time for which the third step was performed (the time for which the third cycle of the second treatment device was executed) (t23). Alternatively, the additional time x may be set so as to be inversely proportional to the time for which the second step was performed (the time for which the second cycle of the second treatment device was executed) (t21).

Meanwhile, in the control method according to the present invention, when, although the first cycle that is executed by the first treatment device is a washing cycle, the time for which the first heat exchange unit 173 was operated is equal to or greater than a predetermined heating reference time or the number of times that the laundry was treated in the first mode (S6) is equal to or greater than a predetermined reference number of times, the control mode may switch from the first mode (S6) to the second mode (S8) (S61). In this case, the operation time of the laundry treatment apparatus 100 is minimized, whereby the power consumption of the laundry treatment apparatus 100 is minimized.

However, the step (S61) of determining whether the time for which the first heat exchange unit 173 was operated is equal to or greater than the heating reference time or the step (not shown) of determining whether the number of times that the laundry was treated in the first mode (S6) is equal to or greater than the reference number of times may be commenced before the fifth step (S633).

In the above embodiment, when the amount of current per unit time that is supplied to the laundry treatment apparatus 100 is equal to or greater than a reference amount of current, the cycle that is being executed by the second treatment device 3 is switched to another cycle. However, the laundry treatment apparatus 100 may be controlled such that the cycle that is being executed by the first treatment device 1 is switched to another cycle.

In the above control method according to the present invention, it is possible to prevent the operation of the two treatment devices 1 and 3 from being simultaneously terminated and to prevent an excessive increase in the time for which the treatment device, the cycle for which has been changed, is operated.

In the above embodiment, the first treatment device executes the first cycle, and the second treatment device executes the second cycle. According to circumstances, the third cycle may be executed instead of the second cycle. However, the terms "first cycle" and "second cycle" are used only to distinguish between the cycle that is executed by the first treatment device and the cycle that is executed by the second treatment device, and do not indicate the sequence in which the two cycles are executed.

In addition, the terms "second cycle" and "third cycle" are used only to indicate that the second cycle and the third cycle are different cycles that are executed by the second treatment device, and do not indicate the sequence in which the two cycles are executed.

FIGS. 3 to 6 are views showing another embodiment of a control method of a laundry treatment apparatus according to the present invention.

In this embodiment, a description will be given of an example of a process in which the laundry treatment apparatus 100 is controlled when a control command is input to the laundry treatment apparatus 100 such that the first treatment device 1 sequentially executes the first cycle and the fourth cycle and the second treatment device executes the second cycle.

As shown in FIG. 3, the control method according to this embodiment includes a step (S1) of inputting courses of the respective treatment devices 1 and 3 and setting reference times of cycles constituting each of the input courses.

The reference time setting step (S1), which is provided to determine when each cycle is terminated, may include a step of setting a reference time T1 of the first treatment device and a reference time T2 of the second treatment device. The reference time T1 of the first treatment device may be configured to set a reference time T11 of a first cycle that is executed by the first treatment device and a reference time T12 of a fourth cycle that is executed by the first treatment device, and the reference time T2 of the second treatment device may be set as a reference time T2 of a second cycle that is executed by the second treatment device.

Subsequently, the control method according to this embodiment performs a first step (S21) of commencing the first cycle of the first treatment device, a second step (S23) of commencing the second cycle of the second treatment device, and a step (S3) of determining whether the amount of current per unit time that is supplied to the laundry treatment apparatus 100 is equal to or greater than a predetermined reference amount of current.

The first step (S21) and the second step (S23) may be commenced simultaneously. Alternatively, one selected from between the first step (S21) and the second step (S23) may be commenced earlier than the other. That is, the first step (S21) and the second step (S23) may be commenced simultaneously or sequentially as long as a period during which electric power is supplied to the first load unit in the first step and a period during which electric power is supplied to the second load unit in the second step overlap each other.

Upon determining that the amount of current per unit time supplied to the laundry treatment apparatus 100 has reached the reference amount of current, the control method according to this embodiment performs a third step (S4) of controlling the first treatment device to execute the first cycle and controlling the second treatment device to execute a third cycle after terminating the second cycle.

After the execution of the third step (S4), the control method according to this embodiment performs a cycle determination step (S5) of determining whether the first cycle that is executed by the first treatment device is a washing cycle or a drying cycle. Upon determining that the first cycle is a washing cycle, laundry is treated in a first mode (S6). Upon determining that the first cycle is a drying cycle, on the other hand, the laundry is treated in a second mode (S8).

FIG. 4 shows an example of the second mode (S8), which is executed when the first cycle is a drying cycle.

In the second mode (S8), it is determined first whether the time (t11+t13) for which the first cycle of the first treatment device was executed has reached the first cycle reference time T11 (S81).

Upon determining that the time (t11+t13) for which the first cycle was executed has not reached the first cycle reference time T11, it is periodically determined whether the time for which the second treatment device was operated has reached the second cycle reference time T2 (S87), and, if so, the operation of the second treatment device is terminated (S871) (see FIG. 5(a)).

As previously described, the time for which the second treatment device was operated may be set to the sum (t21+t23) of the time for which the second step (S23) was performed and the time for which the third step (S4) was performed, or may be set only to the time (t23) for which the third step (S4) was performed.

When the operation of the second treatment device is terminated (S871), as shown in FIG. 5(a), in the second mode (S8), the time for which the first cycle of the first treatment device was executed is compared with the first cycle reference time T11 (S873), and then the first treatment device is controlled to commence the fourth step after terminating the first cycle (S875).

When the time (t15) for which the fourth cycle of the first treatment device was executed has reached the fourth cycle reference time T12, the fourth cycle is terminated (S877 and S879).

On the other hand, upon determining that the time (t11+t13) for which the first cycle of the first treatment device was executed has first reached the first cycle reference time T11 (S81), as shown in FIG. 4, a fourth step (S88) of terminating the first cycle is performed.

When the first cycle of the first treatment device is terminated (S88), a fifth step (S92) of executing the second cycle of the second treatment device 3 and a sixth step (S91) of executing the fourth cycle of the first treatment device 1 are performed. However, the fifth step (S92) is performed only when the time for which the second treatment device was operated is less than the second cycle reference time T2.

When the time (t21) for which the second step (S23) was performed is greater than a predetermined second reference time, the time for which the second treatment device was operated may be the sum (t21+t23) of the time for which the second step was performed and the time for which the third step was performed. When the time (t21) for which the second step (S23) was performed is less than the second reference time, on the other hand, the time for which the second treatment device was operated may be the time (t23) for which the third step was performed.

Meanwhile, upon determining that the time for which the second treatment device was operated has reached the second cycle reference time T2 (S89), in the second mode (S8), as shown in FIG. 5(b), a step (S911) of terminating the operation of the second treatment device, a step (S913) of determining whether the time (t15) for which the fourth cycle of the first treatment device was executed has reached the fourth cycle reference time T12, and a step (S915) of terminating the fourth cycle are sequentially performed.

However, upon determining that the time for which the second treatment device was operated has not reached the second cycle reference time T2, as shown in FIG. 4, in the second mode (S8), the fourth cycle and the second cycle are simultaneously executed (S91 and S92).

In this case, in the second mode (S8), it is periodically determined whether the amount of current per unit time that is supplied to the laundry treatment apparatus 100 is equal to or greater than the reference amount of current (S93).

In a case in which the amount of current per unit time supplied to the laundry treatment apparatus 100 does not exceed the reference amount of current even though the fifth step (S92) and the sixth step (S91) are performed simultaneously, the operation of the first treatment device 1 is terminated when the time (t15) for which the fourth cycle was executed has reached the fourth cycle reference time T12 (S931 and S933), and the operation of the second treatment device 3 is terminated when the time (t21+t23+t25 or t23+t25) for which the second treatment device 3 was operated has reached the second cycle reference time T2 (S932 and S934).

When the amount of current per unit time supplied to the laundry treatment apparatus 100 exceeds the reference amount of current during the performance of the fifth step (S92) and the sixth step (S91), however, in the second mode (S8), a seventh step (S95) of switching the cycle of the second treatment device from the second cycle to the third cycle is performed depending on whether the time for which the second treatment device 3 was operated has reached the second cycle reference time T2 (S94).

That is, in the second mode (S8), when the time (t21+t23+t25 or t23+t25) for which the second treatment device was operated has reached the second cycle reference time T2, the operation of the second treatment device is terminated (S911) (see FIG. 5(*b*)), and the fourth cycle of the first treatment device is executed (S913 and S915).

When the time for which the second treatment device was operated has not reached the second cycle reference time T2, however, the seventh step (S95), at which the third cycle of the second treatment device is executed together with the fourth cycle of the first treatment device, is performed.

When the time (t15+t17) for which the fourth cycle of the first treatment device was executed has reached the fourth cycle reference time T12 during the performance of the seventh step, in the second mode (S8), an eighth step (S952) of terminating the fourth cycle of the first treatment device and a step (S953) of determining whether the time for which the second treatment device was operated has reached the second cycle reference time T2 are performed.

Upon determining that the time for which the second treatment device was operated has reached the second cycle reference time T2, in the second mode (S8), the operation of the second treatment device is terminated (S956). On the other hand, upon determining that the time for which the second treatment device was operated has not reached the second cycle reference time T2, in the second mode (S8), a ninth step (S954) of resuming the second cycle of the second treatment device is performed.

The ninth step (S954) is performed until the sum of the time (t21) for which the second step was performed, the time (t23) for which the third step was performed, the time (t25) for which the fifth step was performed, the time (t27) for which the seventh step was performed, and the time (t29) for which the ninth step was performed reaches the second cycle reference time T2 (S955).

However, if the time (t21) for which the second step was performed is less than the second reference time, the ninth step (S954) may be performed until the sum of the time (t23) for which the third step was performed, the time (t25) for which the fifth step was performed, the time (t27) for which the seventh step was performed, and the time (t29) for which the ninth step was performed reaches the second cycle reference time T2.

Meanwhile, when the time for which the second treatment device was operated has reached the second cycle reference time T2 earlier than the time (t15+t17) for which the fourth cycle of the first treatment device was executed has reached the fourth cycle reference time T12 (S957), in the second mode (S8), the operation of the second treatment device is terminated (S958), the fourth cycle is executed for the reference time T12, and then the operation of the first treatment device is terminated (S958 and S959).

Hereinafter, the first mode (S6), which is performed upon determining at the cycle determination step (S5) of FIG. 3 that the first cycle of the first treatment device is a washing cycle, will be described with reference to FIG. 6.

During the execution of the first cycle of the first treatment device and the second cycle of the second treatment device (S4), in the first mode (S6), it is determined whether the time for which the first heat exchange unit 173 of the first treatment device was operated is equal to or greater than a predetermined heating reference time.

Upon determining that the time for which the first heat exchange unit was operated is equal to or greater than the heating reference time, the control mode is switched from the first mode (S6) to the second mode (S8), and then the laundry is treated.

Upon determining that the time for which the first heat exchange unit was operated is less than the heating reference time, on the other hand, it is determined whether the time (t11+t13) for which the first cycle of the first treatment device was executed has reached the first cycle reference time T11 (S62).

Upon determining that the time (t11+t13) of the time for which the first cycle of the first treatment device was executed has reached the first cycle reference time T11, a fourth step (S66) of terminating the first cycle is performed.

When the first cycle of the first treatment device is terminated (S66), a fifth step (S673) of terminating the third cycle and executing the second cycle of the second treatment device 3 is performed, and a sixth step (S671) of executing the fourth cycle of the first treatment device 1 is performed.

During simultaneous execution of the fourth cycle and the second cycle (S67), in the first mode (S6), it is periodically determined whether the amount of current per unit time that is supplied to the laundry treatment apparatus 100 is equal to or greater than the reference current amount (S7).

Upon determining that the amount of current per unit time supplied to the laundry treatment apparatus 100 has exceeded the reference current amount during simultaneous execution of the fifth step (S673) and the sixth step (S671), in the first mode (S6), a second determination step (S75) of determining the kind of the fourth cycle, which is executed by the first treatment device, is performed.

Upon determining in the second determination step (S75) that the fourth cycle is a drying cycle, the control mode is switched from the first mode (S6) to the second mode (S8).

Meanwhile, in a case in which the time for which the first heat exchange unit 173 of the first treatment device was operated is equal to or greater than the heating reference time even though the fourth cycle is a drying cycle, the control mode is switched from the first mode (S6) to the second mode (S8) (S751).

On the other hand, in a case in which the time for which the first heat exchange unit 173 was operated is less than the heating reference time, in the first mode (S6), a seventh step (S752) of maintaining the fourth cycle of the first treatment device and performing switching from the second cycle to the third cycle of the second treatment device is performed.

When the time (t14+t16) for which the fourth cycle of the first treatment device was executed has reached the fourth cycle reference time T12 during the performance of the seventh step (S752), in the first mode (S6), an eighth step (S754) of terminating the fourth cycle of the first treatment device is performed.

Meanwhile, when the fourth cycle of the first treatment device is terminated as the result of performing the eighth step (S754), in the first mode (S6), a ninth step (S755) of terminating the third cycle and executing the second cycle of the second treatment device is performed. The ninth step (S755) is performed until the time (t26) for which the second cycle of the second treatment device has been continuously executed reaches the second cycle reference time T2 (S756 and S757).

Alternatively, the ninth step (S755) may be performed until the sum (t21+t24+t26) of the time for which the second cycle was executed in the second step (S23), the fifth step (S673), and the ninth step (S755) reaches the modified reference time T2+x.

The additional time x may be set so as to be proportional to one selected from between the time (t23) for which the third step was performed and the time for which the seventh step was performed. Alternatively, the additional time x may be set so as to be proportional to the sum of the time (t23) for which the third step was performed and the time for which the seventh step was performed.

In addition, the additional time x may be set so as to be inversely proportional to one selected from between the time (t21) for which the second step was performed and the time (t24) for which the fifth step was performed. Alternatively, the additional time x may be set so as to be inversely proportional to the sum of the time (t21) for which the second step was performed and the time (t24) for which the fifth step was performed.

The additional time x may be set so as to increase in proportion to the time for which the second cycle was delayed (the time for which the third cycle was executed). The longer the time for which the second cycle was executed is, the smaller the additional time x is set to be, in order to achieve desired effects through the second cycle using the minimum amount of electric power.

Meanwhile, when the amount of current per unit time that is supplied to the laundry treatment apparatus does not exceed the reference current amount even though the fifth step and the sixth step are simultaneously performed (S67), the sixth step (S671) is terminated when the time (t14) for which the fourth cycle of the first treatment device was executed has reached the fourth cycle reference time T12 (S71 and S711), and the fifth step (S673) is terminated when the time (t24) for which the second cycle of the second treatment device was continuously executed has reached the second cycle reference time T2 (S72 and S74).

Even in this case, however, the fifth step (S673) may be terminated when the sum (t21+t24) of the time for which the second cycle of the second treatment device was executed has reached the modified reference time T2+x.

The fourth cycle of the first treatment device may be identical to the first cycle of the first treatment device. Alternatively, the fourth cycle of the first treatment device may be different from the first cycle of the first treatment device.

In a case in which the first cycle and the fourth cycle are different from each other, the first cycle may be a cycle for heating wash water using the first heat exchange unit, and the fourth cycle may be a cycle for heating air using the second heat exchange unit.

In a case in which the first cycle and the fourth cycle are the same, on the other hand, during the operation of the second treatment device, the supply of electric power to the first treatment device may be interrupted as the result of terminating the cycle that is being executed by the first treatment device, and then the supply of electric power to the first treatment device may be resumed in order to execute the same cycle.

In the above embodiment, the first treatment device executes the first cycle and the fourth cycle, and the second treatment device executes the second cycle. According to circumstances, the third cycle may be executed instead of the second cycle. However, the terms "first cycle" and "second cycle" are used only to distinguish between the cycle that is executed by the first treatment device and the cycle that is executed by the second treatment device, and do not indicate the sequence in which the two cycles are executed.

In addition, the terms "first cycle" and "fourth cycle" are used to indicate that the first cycle and the fourth cycle are different cycles that are executed by the first treatment device and to distinguish them from the cycle that is executed by the second treatment device, and the terms "first cycle", "second cycle", "third cycle", and "fourth cycle" do not indicate the sequence in which these cycles are executed.

The present invention provides a control method of a laundry treatment apparatus including at least two treatment devices (for example, a dryer, a washer, a washer and dryer, etc.) for treating laundry.

In addition, the present invention provides a control method of a laundry treatment apparatus that is capable of preventing the operation of a first treatment device and a second treatment device for treating laundry from being simultaneously interrupted due to overcurrent even when the two treatment devices are operated simultaneously.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A control method of a laundry treatment apparatus comprising a first treatment device having a first load unit for treating laundry and a second treatment device having a second load unit for treating laundry, the control method comprising:
supplying electric power to the first load unit to execute a first cycle set in the first treatment device (a first step);
supplying electric power to the second load unit to execute a second cycle set in the second treatment device (a second step), the second step being performed during performance of the first step;
when an amount of current per unit time that is supplied to the laundry treatment apparatus is equal to or greater than a predetermined reference current amount, terminating the second step and executing a third cycle set in the second treatment device so as to consume a lower amount of current than an amount of current per unit time necessary to execute the second cycle (a third step);
terminating the first cycle of the first treatment device (a fourth step); and
re-executing the second cycle of the second treatment device (a fifth step) after completing the fourth step, wherein re-executing the second cycle comprises:

terminating the third cycle and re-executing the second cycle of the second treatment device after completing the fourth step, if the first cycle is a cycle for heating water to treat the laundry; and determining whether to re-execute the second cycle of the second treatment device based on an execution time at which the second cycle and the third cycle were executed in the second treatment device, if the first cycle is a cycle for supplying heated air to treat the laundry.

2. The control method according to claim 1, wherein, if the first cycle is the cycle for supplying heated air to treat the laundry, the fifth step is performed only when the execution time at which the second cycle and the third cycle were executed in the second treatment device is less than a predetermined second cycle reference time.

3. The control method according to claim 2, wherein, when an execution time of the second cycle in the second step is greater than a second reference time set so as to be less than the second cycle reference time, the second cycle in the fifth step is executed until a sum of an execution time of the second cycle in the second step, an execution time of the third cycle, and an re-execution time of the second cycle in the fifth step reaches the second cycle reference time.

4. The control method according to claim 2, wherein, when an execution time of the second cycle in the second step is less than a second reference time set so as to be less than the second cycle reference time, the second cycle in the fifth step is executed until a sum of an execution time of the third cycle and an re-execution time of the second cycle in the fifth step reaches the second cycle reference time.

5. The control method according to claim 1, wherein, if the first cycle is the cycle for heating water to treat the laundry, the fifth step is terminated:

when a re-execution time of the second cycle in the fifth step reaches a predetermined second cycle reference time;

when a sum of the execution time of the second cycle in the second step and the re-execution time of the second cycle in the fifth step reaches the second cycle reference time; or when the sum of the execution time of the second cycle in the second step and the execution time of the second cycle in the fifth step reaches a time obtained by adding a predetermined additional time to the second cycle reference time.

6. The control method according to claim 5, further comprising:

supplying electric power to the first load unit to execute a fourth cycle set in the first treatment device after completing the fourth step (a sixth step), the sixth step being performed during performance of the fifth step; and when the amount of current per unit time that is supplied to the laundry treatment apparatus during performance of the fifth step and the sixth step is equal to or greater than the reference current amount, terminating the fifth step and re-executing the third cycle of the second treatment device (a seventh step).

7. The control method according to claim 6, further comprising:

terminating the sixth step (an eighth step); and terminating the seventh step and executing the second cycle of the second treatment device (a ninth step).

8. The control method according to claim 7, wherein the ninth step is terminated when a sum of continuous execution times of the second cycle in the ninth step reaches the second cycle reference time or when a sum of the execution time of the second cycle in the second step, the execution time of the second cycle in the fifth step, and the execution time of the second cycle in the ninth step reaches the second cycle reference time.

9. The control method according to claim 7, wherein the ninth step is terminated when a sum of the execution time of the second cycle in the second step, the execution time of the second cycle in the fifth step, and the execution time of the second cycle in the ninth step reaches a time obtained by adding a predetermined additional time to the second cycle reference time.

10. The control method according to claim 9, wherein the additional time is set so as to be proportional to at least one selected from between an execution time of the third cycle in the third step and a re-execution time of third cycle in the seventh step or to be inversely proportional to at least one selected from between the execution time of the second cycle in the second step and the re-execution time of second cycle in the fifth step.

11. The control method according to claim 5, wherein, when a number of times that the second cycle was executed is equal to or greater than a predetermined reference number of times, the fifth step is commenced when a sum of the execution time of the second cycle in the second step and the execution time of the third cycle in the third step is less than the second cycle reference time or when the execution time of the third cycle in the third step is less than the second cycle reference time, and the fifth step is continued until a sum of the execution time of the second cycle in the second step, the execution time of the third cycle in the third step, and the re-execution time of the second cycle in the fifth step reaches the second cycle reference time or until a sum of the execution time of the third cycle in the third step and the re-execution time of the second cycle in the fifth step reaches the second cycle reference time.

12. The control method according to claim 5, wherein, when an operation time of a heat exchange unit provided in the first load unit for heating a fluid is equal to or greater than a predetermined heating reference time, the fifth step is commenced when a sum of the execution time of the second cycle in the second step and the execution time of the third cycle in the third step is less than the second cycle reference time or when execution time of the third cycle in the third step is less than the second cycle reference time, and the fifth step is continued until a sum of the execution time of the second cycle in the second step, the execution time of the third cycle in the third step, and the re-execution time of the second cycle in the fifth step reaches the second cycle reference time or until a sum of the execution time of the third cycle in the third step and the re-execution time of the second cycle in the fifth step reaches the second cycle reference time.

13. The control method according to claim 1, wherein when an amount of current per unit time that is supplied to the first treatment device is equal to or greater than an amount of current per unit time necessary to operate a heat exchange unit provided in the first load unit in order to heat a gas, the first cycle is determined to be the cycle for supplying heated air to treat the laundry, and when the amount of current per unit time that is supplied to the first treatment device is less than the amount of current per unit time necessary to operate the heat exchange unit, the first cycle is determined to be the cycle for supplying water to treat the laundry.

14. The control method according to claim 1, wherein
when an increase in an amount of current that is supplied to the first treatment device for a predetermined time is less than a predetermined reference value, the first cycle is determined to be the cycle for supplying water to treat the laundry, and
when the increase in the amount of current that is supplied to the first treatment device for the predetermined time is greater than the reference value, the first cycle is determined to be the cycle for supplying heated air to treat the laundry.

15. The control method according to claim 1, wherein
when a period of fluctuation in an amount of current per unit time that is supplied to the first treatment device is shorter than a predetermined reference period, the first cycle is determined to be the cycle for supplying heated air to treat the laundry, and
when the period of fluctuation in the amount of current per unit time that is supplied to the first treatment device is longer than the reference period, the first cycle is determined to be the cycle for supplying water to treat the laundry.

16. The control method according to claim 1, wherein whether the amount of current per unit time that is supplied to the laundry treatment apparatus is equal to or greater than the reference current amount is determined by determining whether an amount of current per unit time that is supplied to the first treatment device is equal to or greater than the reference current amount.

17. The control method according to claim 16, wherein the reference current amount is set as one selected from between an amount of current per unit time necessary to operate a first heat exchange unit provided in the first load unit in order to heat a fluid and an amount of current per unit time necessary to operate a second heat exchange unit provided in the first load unit in order to heat a gas.

18. The control method according to claim 1, wherein whether the amount of current per unit time that is supplied to the laundry treatment apparatus is equal to or greater than the reference current amount is determined by determining whether a sum of an amount of current per unit time that is supplied to the first treatment device and an amount of current per unit time that is supplied to the second treatment device is equal to or greater than the reference current amount.

19. The control method according to claim 1, wherein a weight of the laundry that can be treated by the first treatment device is higher than a weight of the laundry that can be treated by the second treatment device.

20. The control method according to claim 1, wherein the first step and the second step are commenced simultaneously, or one selected from between the first step and the second step is commenced earlier than the other.

21. A laundry treatment apparatus, comprising:
a first treatment device having a first load unit for treating laundry;
a second treatment device having a second load unit for treating laundry; and
an electric power control device that is connected to a power supply and that is configured to supply electric power to the first treatment device and the second treatment device, comprises at least one processor,
wherein the at least one processor is configured to:
supply electric power to the first load unit to execute a first cycle set in the first treatment device;
supply electric power to the second load unit to execute a second cycle set in the second treatment device, the second cycle being executed during execution of the first cycle;
when an amount of current per unit time that is supplied to the laundry treatment apparatus is equal to or greater than a predetermined reference current amount, control the second treatment device to terminate the second cycle and execute a third cycle so as to consume a lower amount of current than an amount of current per unit time necessary to execute the second cycle;
control the first treatment device to terminate the first cycle; and
control the second treatment device to re-execute the second cycle after terminating the first cycle, and
wherein the at least one processor is further configured to:
control the second treatment device to terminate the third cycle and re-executethe second cycle after terminating the first cycle, if the first cycle is a cycle for heating water to treat the laundry; and
determine whether to re-execute the second cycle of the second treatment device based on an execution time at which the second cycle and the third cycle were executed in the second treatment device, if the first cycle is a cycle for supplying heated air to treat the laundry.

* * * * *